: US005343679A

United States Patent [19]
Cymara

[11] Patent Number: 5,343,679
[45] Date of Patent: Sep. 6, 1994

[54] LEAF BALER

[76] Inventor: Hermann K. Cymara, 106 Stonehaven Cir., Newfield, N.Y. 14867

[21] Appl. No.: 159,514

[22] Filed: Dec. 1, 1993

[51] Int. Cl.⁵ .............................................. A01D 43/02
[52] U.S. Cl. ...................................... 56/16.6; 56/344; 100/145
[58] Field of Search ......... 56/341, 342, 362, DIG. 21, 56/13.2, 16.6, 202, 344; 141/114, 313, 314, 316; 53/459, 467, 570, 576; 100/65, 145, 189, 229 A; 15/79.2, 83, 328, 348

[56] References Cited
U.S. PATENT DOCUMENTS

| | | | |
|---|---|---|---|
| 3,229,320 | 1/1966 | Cymara | 15/348 |
| 3,736,736 | 6/1973 | Myers | 56/202 X |
| 4,655,128 | 4/1987 | St. Clair | 100/145 |

Primary Examiner—Ramon S. Britts
Assistant Examiner—James A. Lisehora
Attorney, Agent, or Firm—Charles S. McGuire

[57] ABSTRACT

Apparatus for picking up leaves and other loose material from a lawn or other surface and compacting such material in a bag for disposal. As in prior art apparatus of this type, the material is propelled by a rotating paddle wheel into the forward section of a housing, and from a rear housing section to an auger compactor which feeds the material into a bag positioned upon and against side and end support walls. In the present apparatus, better compaction is achieved by inhibiting rotation of the material within the bag due to rotation imparted by the auger. This action is provided by protrusions on the end and side walls of the support walls which indent the flexible bag as it is filled. As a further safety feature, a skirt carrying pivoted obstruction members prevents objects from being propelled forwardly of the apparatus.

20 Claims, 3 Drawing Sheets

LEAF BALER

BACKGROUND OF THE INVENTION

The present invention relates to implements of the lawn sweeper type, and more specifically to improvements in power-driven lawn implements of the type disclosed in U.S. Pat. No. 3,229,320 of the present inventor.

The apparatus of the aforementioned patent is adapted to pick up loose leaves, grass, and the like, lying upon a lawn, park, roadside, etc. and deposit them by an auger-type feed mechanism in a bag releasably mounted on the implement. Although the implement is generally effective for the intended purpose, it has been found that, although the bag is stationarily mounted upon the apparatus, the leaves or other loose material may be rotated by the auger, whereby the material is not well compacted within the bag. Also, due to the position and manner of movement of the sweeper or pick-up portion of the apparatus, small stones, etc. may be thrown forwardly of the apparatus, creating a safety hazard.

The principal object of the present invention is to provide a novel and improved lawn implement for picking up and bagging leaves, grass, and the like, wherein the loose material is more densely compacted within the bag than in similar, prior apparatus of this type.

A further object is to provide a power-driven implement in the nature of a lawn sweeper and leaf baler having simple yet effective means for reducing or eliminating the safety hazard arising from stones, or the like, which may be propelled outwardly by the moving pick-up mechanism.

Still another object is to provide a power-driven lawn implement having both of the aforementioned improved features.

Other objects will in part be obvious and will in part appear hereinafter.

SUMMARY OF THE INVENTION

The basic structure of the lawn implement of the present invention may be the same in many respects as that of aforementioned U.S. Pat. No. 3,229,320, the disclosure of which is incorporated by reference herein. As seen in the prior patent, the apparatus includes, in addition to the usual frame and ground-engaging wheels, power-driven sweeper and auger means for respectively picking up loose leaves, etc. and feeding such material into the open end of a flexible bag supported in a horizontal orientation upon the apparatus. The closed end of the bag abuts against a smooth, flat, circular plate mounted for movement against a controlled resistance as the bag is filled. The bag is further supported over approximately the lower 180° of its sidewall by a semi-cylindrical, smooth, flat plate. Although the bag and its supporting plates do not rotate, the leaves entering the bag tend to rotate due to rotary movement of the auger with resulting loss of compaction.

In the apparatus of the present invention, rotation of the loose materials within the bag is inhibited and compaction improved by providing projections on one or both of the flat end plate and semi-cylindrical side support plate. These projections are preferably in the nature of radially extending vanes or ribs on the end plate, and longitudinally extending rods on the side support plate. These stationary projections indent the bottom (closed end) and/or lower sides of the filled portion of the bag to inhibit rotation of the material deposited in the bag. Also, the rotation-inhibiting effect is enhanced by the fact that the material leaving the discharge end of the auger is normally intertwined with the material already in the bag which is inhibited from rotation by the projections on the support plates.

In a second aspect of improvement of the apparatus, a skirt extends forwardly of the lower, front section of the pick-up housing, providing a solid wall a few inches above the ground. A plurality of L-shaped plates are pivotally attached to the skirt and include portions normally extending downwardly therefrom to edges in close proximity to the surface over which the apparatus travels. The plates are cooperatively arranged to provide, in combination, an essentially continuous vertical wall extending downwardly from the skirt. The pivotal mounting of the plates permits movement in a rearward direction, whereby they do not interfere with forward movement of the apparatus over rocks, sticks, etc., but prevents such objects from being propelled in the forward direction so that such objects are not forcibly ejected from the apparatus.

DETAILED DESCRIPTION

Figure 1:
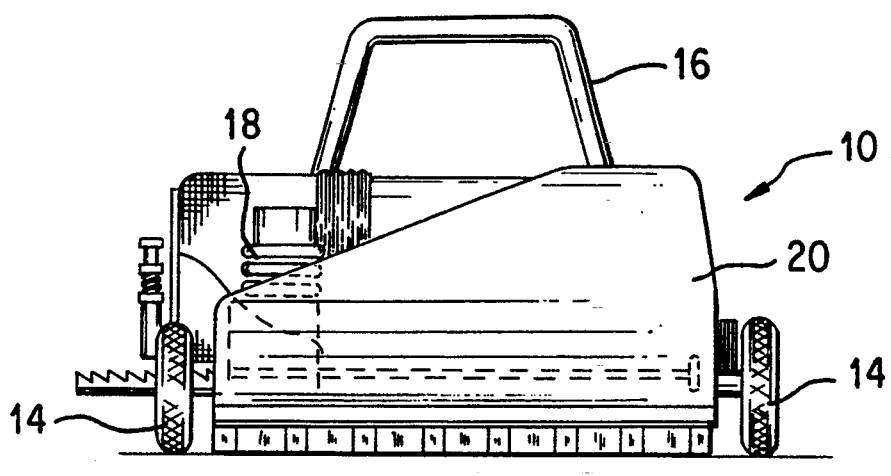
FIG. 1 is a front elevational view of the apparatus of the invention.
Figure 3:
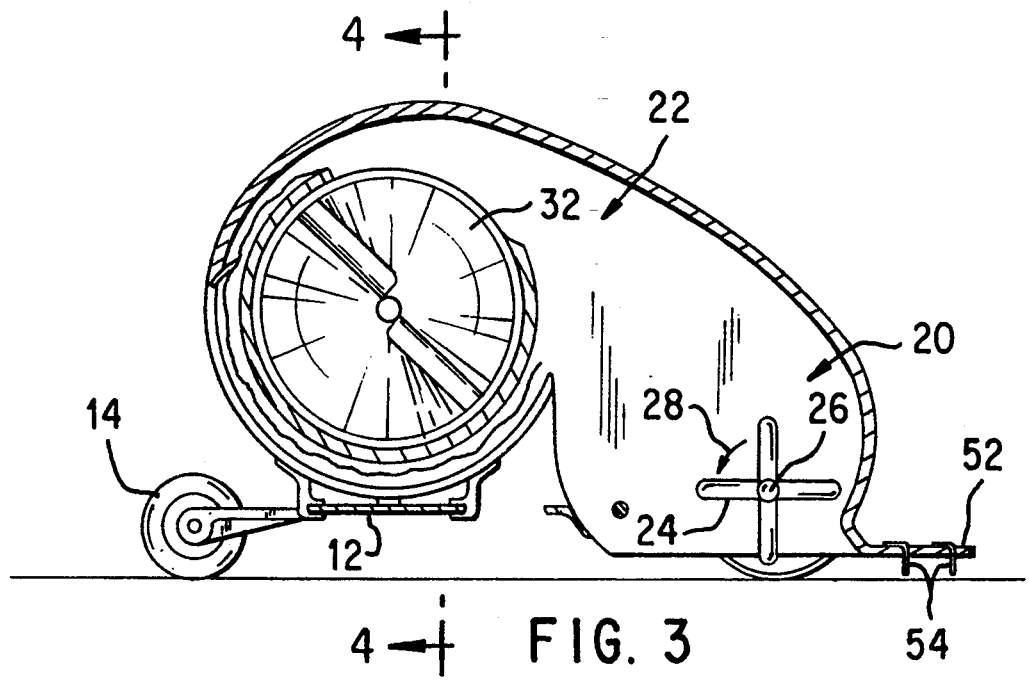
FIG. 3 is a side elevational view in section on the line 3—3 of FIG. 2.
Figure 2:
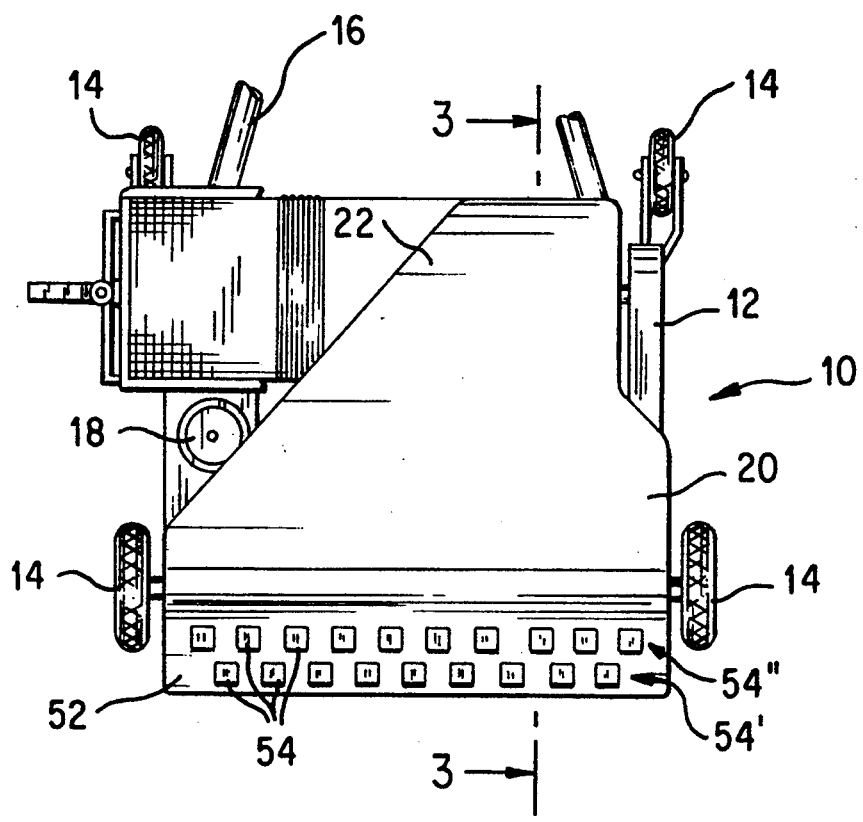
FIG. 2 is a top plan view thereof.

Referring now to the drawings, the leaf baler apparatus of the invention, denoted generally by reference numeral 10, includes suitable rigid frame means 12 supported for movement over the ground upon wheels 14. Handle 16 for guiding the apparatus, and motor 18 for driving certain moveable elements described later are mounted upon respective portions of frame means 12. Baler 10 includes integral, forward and rear housing sections 20 and 22, respectively. Forward section 20 extends substantially the full width of the baler and converges from one side toward the other from front to rear to meet rear section 22, as best seen in FIG. 2. Also, as seen in FIGS. 1 and 3, forward section 20 slopes upwardly from left to right, as seen from the front, and from front to rear.

Paddle wheel 24 is mounted upon shaft 26 (FIG. 4) for rotation by motor 18 in the direction of arrow 28 through a suitable belt and pulley connection (not shown). Thus, as baler 10 is moved over the ground, leaves, loose grass, etc. will be picked up by paddle wheel 24 and propelled from front section 20 to the upper area of rear housing section 22. Auger 32 is mounted for rotation upon shaft 34 which extends laterally across rear housing section 22 and is driven by motor 18 via conventional shafts, gears, pulleys and belts. Leaves enter auger 32 from rear housing section 22 and are moved from right to left, as seen in FIG. 4.

Leaves delivered by auger 32 are compacted in a flexible bag 36 having an open end which is drawn over cylinder 39, surrounding the discharge end of auger 32. Except for the relative arrangement and configuration of certain parts, the features of baler 10 thus far described are essentially the same as those of aforementioned U.S. Pat. No. 3,229,320, to which reference may be had for any additional constructional details.

Figure 5:
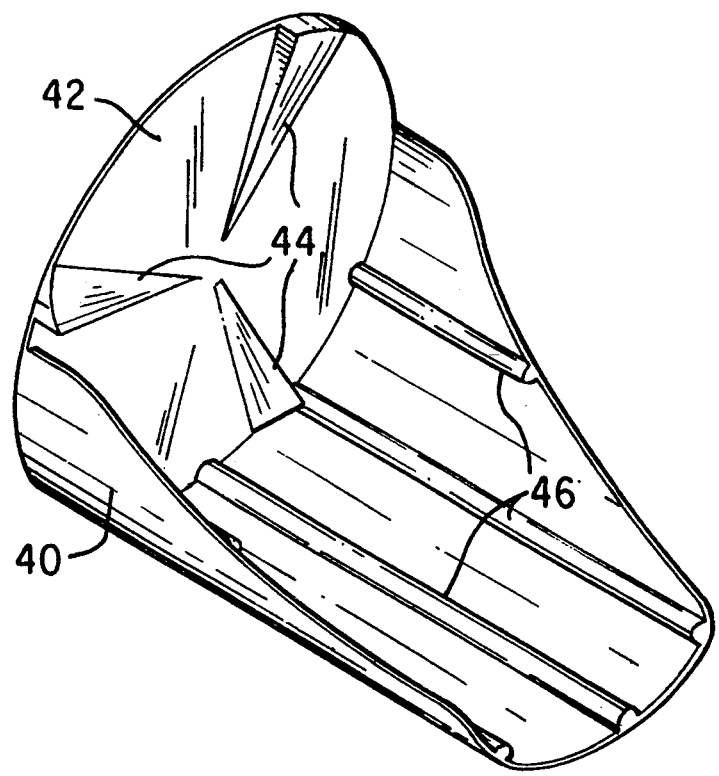
FIG. 5 is a fragmentary, perspective view of a portion of the apparatus.
Figure 4:
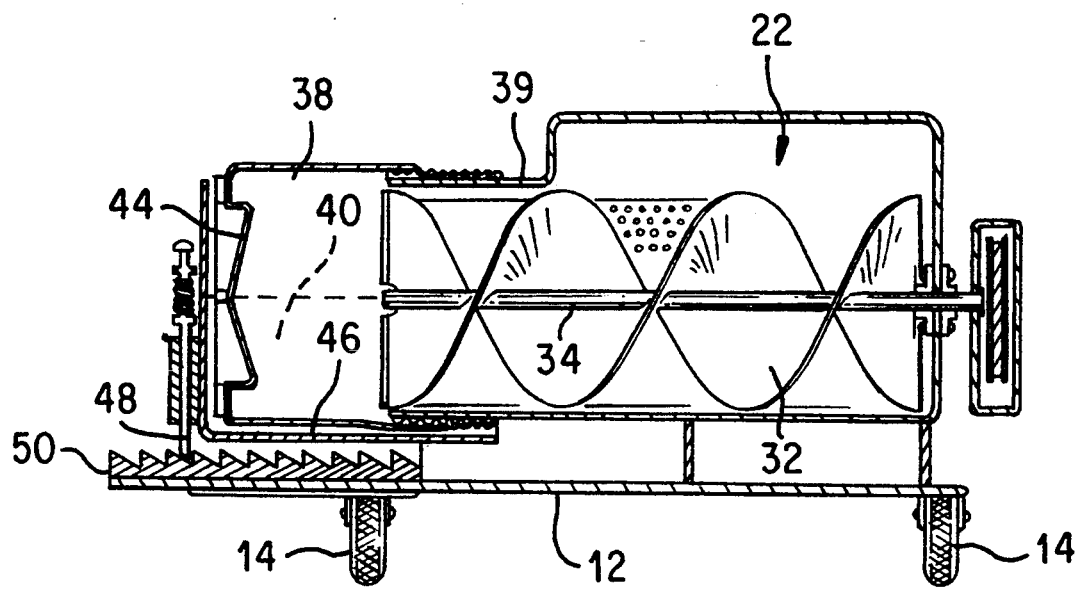
FIG. 4 is a front elevational view in section on the line 4—4 of FIG. 3.

One of the distinguishing features of the present invention, providing improved operation over the prior art baler, is shown individually in FIG. 5, and in association with other elements in FIG. 4. Semi-cylindrical bag support 40 is affixed to circular end plate 42. Radial protrusions 44 extend from end plate 42 in the direction of the discharge end of auger 32. A plurality of rods 46 extend axially of support 40, being fixedly attached to the inner surface thereof. As leaves are compacted by auger 32 in bag 36, support 40 and its associated end plate 42 are moved toward the left, as seen in FIG. 4, with controlled resistance to such movement provided by spring-loaded detent rod 48 riding over successive teeth of ratchet member 50, as in the prior art baler.

A difficulty sometimes encountered with the prior art baler was the tendency of the leaves to rotate within the bag under the rotational impulse of the auger. This detracts from good compaction of the leaves within the bag. Radial protrusions 44 indent the bag bottom and rods 46 indent the lower portion of the bag sidewall as the leaves are pushed into the bag, thereby inhibiting leaf rotation and providing good compaction. When bag 36 is full, of course, it is removed and replaced by another bag with end plate 42 returned to its position adjacent the discharge end of auger 32.

Figure 6:
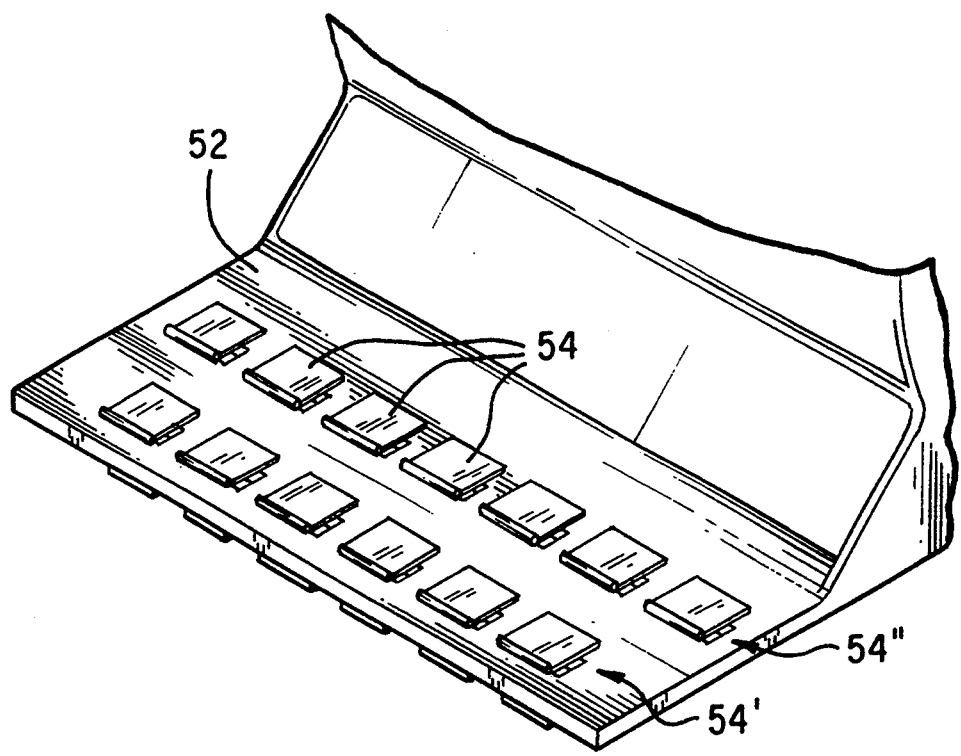
FIG. 6 is a fragmentary, perspective view of another portion of the apparatus.

An additional safety feature, baler 10 is provided with means for preventing rocks, sticks, etc. from being propelled forwardly by paddle wheel 24. Such means comprise an essentially planar skirt 52 extending forwardly from the lower, front edge of forward housing section 20, and a plurality of L-shaped plates or baffles 54, pivotally mounted upon individual pins 56 for movement within respective openings 58 in skirt 52. Baffles 54 are mounted in front and rear rows 54' and 54", respectively (FIGS. 2 and 6). The baffles of each row are laterally spaced from one another by a distance slightly less than the width of an individual baffle, whereby the two rows of baffles cooperate to form an essentially continuous wall extending laterally of skirt 52.

Figure 7:
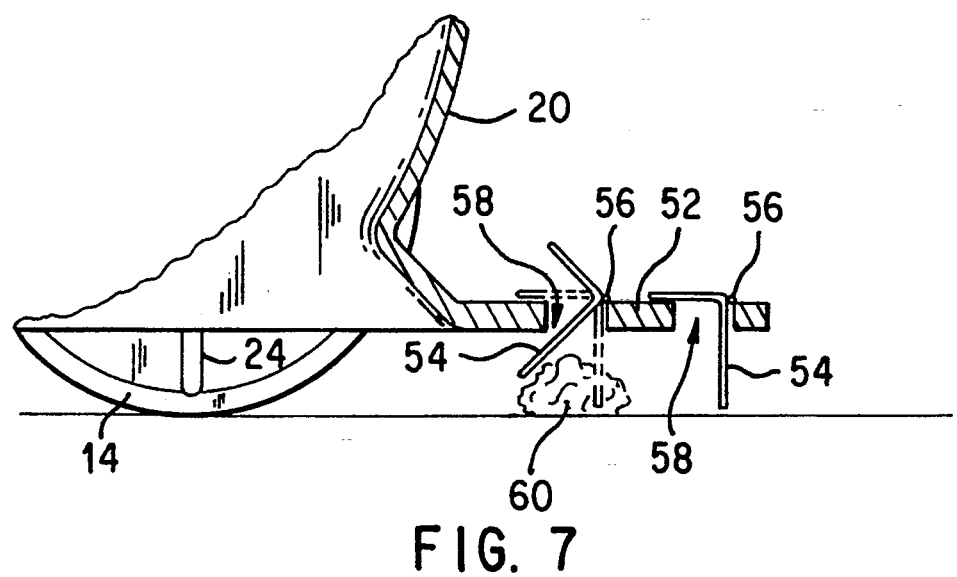
FIG. 7 is a fragmentary, sectional, side elevational view illustrating operation of portions of the apparatus shown.

As seen in FIG. 7, when the downwardly extending portion of any baffle 54 contacts an obstruction, such as rock 60, as baler 10 is moved forwardly, the baffle is pivoted in a clockwise direction and moves over the rock. If rock 60 is propelled forwardly by paddle wheel 24, it will strike the downwardly extending portion of one or more baffles 54, which cannot pivot in a counter-clockwise direction due to contact of the upper, rearwardly extending portion of the baffles with the upper surface of skirt 52 adjacent the rear edge of the respective opening 58.

From the foregoing, it may be seen that the baler of the present invention provides improved operation with respect to that of the present inventor's prior patent. Inhibiting the leaves from rotating within the bag permits more complete leaf compaction and the array of moveable baffles enhances the safety of operation by preventing objects from being propelled forwardly of the baler.

What is claimed is:

1. Apparatus for picking up and bagging leaves and other loose material from a lawn or other surface, said apparatus comprising:
   a) a frame mounted upon wheels for movement of the apparatus over said surface;
   b) a housing including integral, forward and rear housing sections;
   c) pick-up means for picking up said loose material, said pick-up means being mounted for rotation about an axis extending laterally across said front housing section and adapted to propel said loose material from said surface into said rear housing section;
   d) a rotary compaction mechanism communicating with said rear housing section to receive said loose materials therefrom, said rotary compaction mechanism having a discharge end and moving said material in a predetermined direction to said discharge end;
   e) support means for contacting an exterior surface of a flexible bag and holding said bag in a predetermined position with an open end thereof adjacent said discharge end to receive said loose material in said bag; and
   f) means for inhibiting rotation of said loose material within said bag due to forces applied to said material by said rotary compaction mechanism.

2. The invention according to claim 1 wherein said rotation inhibiting means comprises at least one structural member constructed and arranged to indent a wall of said flexible bag as the bag is filled with said loose material.

3. The invention according to claim 2 wherein said support means includes a substantially circular end plate having a support surface against which said bag is urged as said loose material is compacted in said bag.

4. The invention according to claim 3 wherein said structural member comprises a protrusion extending outwardly toward said discharge end from said support surface.

5. The invention according to claim 4 wherein said protrusion extends radially of said end plate.

6. The invention according to claim 3 wherein said structural member comprises a plurality of protrusions, each extending outwardly from said end plate toward said discharge end.

7. The invention according to claim 6 wherein each of said protrusions extends radially of said end plate.

8. The invention according to claim 2 wherein said support means includes wall means for contacting and for supporting said bag, and said structural member comprises a protrusion extending from said wall means toward said bag.

9. The invention according to claim 8 wherein said wall means is substantially semi-cylindrical and said protrusion is elongated axially of said wall means.

10. The invention according to claim 9 wherein said protrusion comprises a plurality of spaced, rod-like members each extending axially of said wall means.

11. The invention according to claim 8 wherein said support means further includes a substantially circular end plate against which said bag is urged as said loose material is compacted in said bag, and said structural member further comprises a secondary protrusion extending outwardly from a surface of said end plate toward said discharge end.

12. The invention according to claim 11 wherein said secondary protrusion extends radially of said end plate.

13. The invention according to claim 12 wherein said end plate has a center and an outer periphery, and said secondary protrusion comprises a plurality of angularly spaced portions each extending radially substantially from said center to said outer periphery.

14. The invention according to claim 1 wherein said apparatus has a forward direction of movement, wherein said pick-up means propels said loose material in said forward direction of movement and upwardly into said front housing section, and wherein said invention further comprises obstructing means for preventing propulsion of objects forwardly of said apparatus.

15. The invention according to claim 14 wherein said obstructing means comprises a skirt extending forwardly from said forward housing section in spaced relation above said surface, and wall means for extending downwardly from said skirt substantially to said surface to provide a substantially laterally continuous barrier.

16. The invention according to claim 15 wherein said wall means comprise a plurality of obstruction members individually mounted upon said skirt for pivotal movement with respect thereto.

17. The invention according to claim 16 wherein said skirt has a plurality of openings formed therein, said obstruction members are L-shaped, and wherein said obstruction members are mounted to said skirt and extend through respective ones of said openings.

18. The invention according to claim 17 wherein said obstruction members are arranged in at least two parallel rows extending laterally of said apparatus.

19. The invention according to claim 14 wherein said rotation inhibiting means comprises at least one structural member extending from said support means to indent a portion of said flexible bag as said loose material is compacted therein.

20. The invention according to claim 19 wherein said support means includes a substantially circular end wall and semi-cylindrical side wall portions, and said at least one structural member comprises portions extending fixedly from both said end wall and said side wall in the direction of said bag.

* * * * *